United States Patent
Liu et al.

(10) Patent No.: US 12,368,918 B2
(45) Date of Patent: Jul. 22, 2025

(54) HUMAN-COMPUTER INTERACTION METHOD AND SYSTEM OF DISPLAY DEVICE

(71) Applicants: Beijing BOE Optoelectronics Technology Co., Ltd., Beijing (CN); BOE Technology Group Co., Ltd., Beijing (CN)

(72) Inventors: Xiantao Liu, Beijing (CN); Yonghui Wang, Beijing (CN); Chen Meng, Beijing (CN); Bo Fu, Beijing (CN); Zhong Hu, Beijing (CN); Xiaotian Pang, Beijing (CN); Jiarong Liu, Beijing (CN); Jiajia Xin, Beijing (CN); Guosheng Sun, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/022,483

(22) PCT Filed: Mar. 29, 2022

(86) PCT No.: PCT/CN2022/083755
§ 371 (c)(1),
(2) Date: Feb. 21, 2023

(87) PCT Pub. No.: WO2023/184161
PCT Pub. Date: Oct. 5, 2023

(65) Prior Publication Data
US 2024/0267585 A1  Aug. 8, 2024

(51) Int. Cl.
*H04N 21/431* (2011.01)
*H04N 21/2343* (2011.01)

(52) U.S. Cl.
CPC . *H04N 21/4316* (2013.01); *H04N 21/234381* (2013.01)

(58) Field of Classification Search
CPC ........... H04N 9/977; H04N 2201/3297; H04N 5/445; H04N 5/50; H04N 7/0884;
(Continued)

(56) References Cited

U.S. PATENT DOCUMENTS

2009/0027555 A1* 1/2009 Hanko .................. H04N 21/47
348/569
2014/0059616 A1  2/2014 Hanko et al.
(Continued)

FOREIGN PATENT DOCUMENTS

CN        103561219 A    2/2014
CN        105898395 A    8/2016
(Continued)

*Primary Examiner* — Rong Le
(74) *Attorney, Agent, or Firm* — IPro, PLLC (57) ABSTRACT

Disclosed are a human-computer interaction method and system of a display device, which are used for providing a new interaction manner. A main control module is configured to receive an interactive instruction of a user and generate OSD data, and a data processing module is configured to superimpose and display a received video stream and the OSD data. The human-computer interaction system includes a data source generation module, a main control module and a data processing module. The data source generation module is configured to generate a video stream and send the video stream to the data processing module. The main control module is configured to receive an interactive instruction sent by a user, generate OSD data according to the interactive instruction, and transmit the OSD data to the data processing module. The data processing module is configured to superimpose the received video stream with the OSD data, and output the superimposed video stream to (Continued)

a display end for displaying to make a response to the interactive instruction sent by the user.

20 Claims, 6 Drawing Sheets

(58) Field of Classification Search
CPC .... H04N 5/44504; G09G 1/165; G09G 1/167; G09G 2320/10; G09G 2340/0435; G09G 2340/125; G09G 5/005; G09G 5/377; G06G 1/167
See application file for complete search history.

(56) References Cited

U.S. PATENT DOCUMENTS

2017/0053622 A1* 2/2017 Liu .................... H04N 21/8453
2021/0044776 A1   2/2021 Li et al.

FOREIGN PATENT DOCUMENTS

| CN | 105898614 A | 8/2016 |
| CN | 108924621 A | 11/2018 |
| CN | 107888844 B | 6/2021 |
| CN | 113014838 A | 6/2021 |
| CN | 113518213 A | 10/2021 |
| CN | 113903287 A | 1/2022 |

\* cited by examiner

HUMAN-COMPUTER INTERACTION METHOD AND SYSTEM OF DISPLAY DEVICE

CROSS-REFERENCE OF RELATED APPLICATIONS

The present application is a national phase entry under 35 U.S.C. § 371 of International Application No. PCT/CN2022/083755, filed on Mar. 29, 2022.

FIELD

The present disclosure relates to the technical field of human-computer interactions, in particular, to a human-computer interaction method and system of a display device.

BACKGROUND

With the continuous advancement of science and technology, more and more visualization devices have been used in vehicles for daily traveling. At present, transparent display devices have been put into trial operation in a variety of traffic scenarios successively, such as subways. For example, transparent display windows are used to replace original windows, and rich video stream information is displayed through the transparent display windows to create a more scientific and technological smart city.

Since current visualization devices have difficulties in human-computer interaction, how to solve the difficulties in human-computer interaction and to more conveniently perform daily maintenance on display devices has become an urgent technical problem to be solved.

SUMMARY

The present disclosure provides a human-computer interaction method and system of a display device, which are used for providing an interaction manner. A main control module is configured to receive an interactive instruction of a user and generate on-screen display (OSD) data, and a data processing module is configured to superimpose and display a received video stream and the OSD data.

In a first aspect, a human-computer interaction system of a display device provided in embodiments of the present disclosure includes a data source generation module, a main control module and a data processing module.

The data source generation module is configured to generate a video stream and send the video stream to the data processing module.

The main control module is configured to receive an interactive instruction sent by a user, generate OSD data according to the interactive instruction, and transmit the OSD data to the data processing module.

The data processing module is configured to superimpose the received video stream with the OSD data, and output the superimposed video stream to a display end for displaying to make a response to the interactive instruction sent by the user.

In optional embodiments, the main control module receives the interactive instruction sent by the user, which includes:
receiving, by the main control module, the interactive instruction sent, by means of a key, by the user; and/or,
receiving, by the main control module, the interactive instruction sent, by means of a remote terminal, by the user.

In optional embodiments, the main control module receives the interactive instruction sent, by means of the remote terminal, by the user, which includes:
receiving, by the main control module, the interactive instruction sent, by means of the remote terminal, by the user through the data source generation module, wherein the remote terminal and the data source generation module are in communication connection through a wireless network.

In optional embodiments, the main control module and the data source generation module are in communication connection based on an interface standard for serial data communication.

In optional embodiments, the data processing module superimposes the received video stream with the OSD data, which includes:
superimposing the received video stream with the OSD data received at the second time by the data processing module if a time difference between the OSD data received by the data processing module for two consecutive times is less than a threshold.

In optional embodiments, the human-computer interaction system further includes a data storage module.

The data storage module is configured to double, in a manner of storing one frame of video stream and reading two frames of video stream, a frame rate of the video stream generated by the data source generation module, and send the video stream having a doubled frame rate to the data processing module; and
the data processing module superimposes the received video stream having the doubled frame rate with the OSD data.

In optional embodiments, the data processing module superimposes the received video stream having the doubled frame rate with the OSD data, which includes:
determining, by the data processing module, a read bit width of the OSD data according to bit widths of video frames in the video stream having the doubled frame rate; and
reading, by the data processing module, OSD data according to the read bit width, and superimposing the OSD data read at each time with the video frames in the video stream having the doubled frame rate in sequence.

In optional embodiments, the data processing module superimposes the received video stream with the OSD data, which includes:
taking, by the data processing module, a video frame received after receiving the OSD data as a start frame for superimposing;
determining, according to a display duration of the OSD data, the quantity of frames of the video stream for superimposing; and
superimposing the video stream with the OSD data according to the start frame and the quantity of frames.

In optional embodiments, the main control module is configured to transmit the OSD data to the data processing module through a Serial Peripheral Interface (SPI).

In optional embodiments, the data processing module superimposes the received video stream with the OSD data, which includes:
verifying, by the data processing module, the received OSD data, and superimposing the received video stream with the OSD data after the determination that the verification succeeds.

In optional embodiments, the data processing module outputs the superimposed video stream to a display end for displaying, which includes:

performing, by the data processing module, format conversion on the superimposed video stream according to a pre-defined format; and outputting the video stream subjected to the format conversion to the display end for displaying.

In optional embodiments, the main control module transmits the OSD data to the data processing module, which includes:

sending, by the data processing module, an enable signal to the main control module after the determination that the received video stream is displayed at the display end according to a preset requirement, so as to instruct the main control module to start to execute an OSD function; and transmitting, by the main control module, the OSD data to the data processing module after receiving the enable signal.

In optional embodiments, the interactive instruction includes an update instruction.

The main control module is further configured to receive the update instruction sent by the user, generate a parameter according to the update instruction, and transmit the parameter to the data processing module.

The data processing module is configured to control an update of data corresponding to the parameter according to the received parameter.

In optional embodiments, the parameter includes at least one of an OSD parameter or a video stream parameter. The OSD parameter includes at least one of a display duration, a display position or display transparency. The video stream parameter includes at least one of image brightness, contrast, saturation or acutance.

In a second aspect, a human-computer interaction method of a display device provided by embodiments of the present disclosure includes:

generating, by a data source generation module, a video stream, and sending the video stream to a data processing module;

receiving, by a main control module, an interactive instruction sent by a user, generating OSD data according to the interactive instruction, and transmitting the OSD data to the data processing module; and superimposing, by the data processing module, the received video stream with the OSD data, and outputting the superimposed video stream to a display end for displaying to make a response to the interactive instruction sent by the user.

In optional embodiments, the receiving, by the main control module, the interactive instruction sent by the user includes:

receiving, by the main control module, the interactive instruction sent, by means of a key, by the user; and/or, receiving, by the main control module, the interactive instruction sent, by means of a remote terminal, by the user.

In optional embodiments, the receiving, by the main control module, the interactive instruction sent, by means of the remote terminal, by the user includes:

receiving, by the data source generation module, the interactive instruction sent, by means of the remote terminal, by the user, and sending the interactive instruction to the main control module, wherein the remote terminal and the data source generation module are in communication connection through a wireless network.

In optional embodiments, the superimposing, by the data processing module, the received video stream with the OSD data includes:

superimposing, by the data processing module, the received video stream with the OSD data received at the second time if a time difference between the OSD data received for two consecutive times is less than a threshold.

In optional embodiments, the human-computer interaction method further includes:

doubling, in a manner of storing one frame of video stream and reading two frames of video stream by using a data storage module, a frame rate of the video stream generated by the data source generation module, and sending the video stream having a doubled frame rate to the data processing module, so as to instruct the data processing module to superimpose the received video stream having the doubled frame rate with the OSD data.

In optional embodiments, the superimposing, by the data processing module, the received video stream having the doubled frame rate with the OSD data includes:

determining, by the data processing module, a read bit width of the OSD data according to bit widths of video frames in the video stream having the doubled frame rate; and reading OSD data according to the read bit width, and superimposing, by the data processing module, the OSD data read at each time with the video frames in the video stream having the doubled frame rate in sequence.

In optional embodiments, the superimposing, by the data processing module, the received video stream with the OSD data includes:

taking a video frame received after receiving the OSD data as a start frame for superimposing;

determining, according to a display duration of the OSD data, the quantity of frames of the video stream for superimposing; and superimposing, by the data processing module, the video stream with the OSD data according to the start frame and the quantity of frames.

In optional embodiments, the superimposing, by the data processing module, the received video stream with the OSD data includes:

verifying, by the data processing module, the received OSD data, and superimposing the received video stream with the OSD data after the determination that the verification succeeds.

In optional embodiments, the outputting, by the data processing module, the superimposed video stream to the display end for displaying includes:

performing, by the data processing module, format conversion on the superimposed video stream according to a pre-defined format; and outputting the video stream subjected to the format conversion to the display end for displaying.

In optional embodiments, the transmitting, by the main control module, the OSD data to the data processing module includes:

controlling the data processing module to send an enable signal to the main control module after the determination that the received video stream is displayed at the display end according to a preset requirement, so as to instruct the main control module to transmit the OSD data to the data processing module after receiving the enable signal.

In optional embodiments, the interactive instruction includes an update instruction; and the human-computer interaction method further includes:

receiving, by the main control module, the update instruction sent by the user, generating a parameter according to the update instruction, and transmitting the parameter to the data processing module; and controlling an update of data corresponding to the parameter by the data processing module according to the received parameter.

In optional embodiments, the parameter includes at least one of an OSD parameter or a video stream parameter. The OSD parameter includes at least one of a display duration, a display position or display transparency. The video stream parameter includes at least one of image brightness, contrast, saturation or acutance.

In a third aspect, embodiments of the present disclosure further provide a computer storage medium which stores a computer program. The program, when executed by a processor, is configured to implement the steps of the method in the foregoing second aspect.

These and other aspects of the present disclosure will be clearer and more understandable in the descriptions of the following embodiments.

BRIEF DESCRIPTION OF THE DRAWINGS

In order to explain the technical solutions of the embodiments of the present disclosure more clearly, the accompanying drawings used in the description of the embodiments will be described briefly. Apparently, the drawings in the following description are only some embodiments of the present disclosure. Those of ordinary skill in the art can obtain other drawings based on these drawings without creative work.

DETAILED DESCRIPTION OF THE EMBODIMENTS

In order to make objectives, technical solutions and advantages of the present disclosure clearer, the present disclosure is further described below in detail in conjunction with the accompanying drawings. Obviously, the embodiments described are only one part of embodiments of the present disclosure, but not all the embodiments. Based on the embodiments in the present disclosure, all other embodiments obtained by those of ordinary skill in the art without creative work shall fall within the protection scope of the present disclosure.

The term "and/or" in the embodiments of the present disclosure describes an association relation of associated objects, indicating that there can be three kinds of relations. For example. A and/or B can mean: A exists alone. A and B exist at the same time, and B exists alone. The character "/" generally indicates that the contextually associated objects are in an "or" relationship.

Application scenarios described in the embodiments of the present disclosure are to explain the technical solutions of the embodiments of the present disclosure more clearly, and do not constitute a limitation to the technical solutions provided by the embodiments of the present disclosure. Those of ordinary skill in the art can know that the technical solutions provided by the embodiments of the present disclosure are also applicable to similar technical problems as new application scenarios appear. In the description of the present disclosure, unless otherwise stated. "plurality" means two or more.

Embodiment 1: With the continuous advancement of science and technology, more and more visualization devices have been used in vehicles for daily traveling. At present, transparent display devices have been put into trial operation in a variety of traffic scenarios successively, such as subways. For example, transparent display windows are used to replace original windows, and rich video stream information is displayed through the transparent display windows to create a more scientific and technological smart city. OSD (on-screen display, which is a screen menu-type adjustment manner) refers to a rectangular menu of various pieces of adjustment item information of a display, which pops up after a main menu key is pressed, and all working indexes of the display, including color, mode, geometric shape and the like, can be adjusted through this menu. When the OSD is applied to a transparent display window: human-computer interactions should be realized through an OSD menu to control a display effect of the transparent display window: At present, since a closed shell is arranged outside a transparent display device, and is mounted on a vehicle body, it is not convenient to use a key or infrared remote control to control the OSD menu when the display effect of the transparent display device is to be controlled. If a key is used, it is inevitable that non-relevant personnel may operate the key to control the display effect, and there are multiple uncontrollable factors. If the infrared remote control is used, it is hard to ensure the timeliness, effectiveness and accuracy of the infrared remote control due to the closure of the transparent display device, and thus the display effect of the transparent display device cannot be well controlled. Therefore, the existing method for adjusting the display effect of the transparent display device through the OSD menu brings a poor visual experience to users, and also causes a difficulty in maintenance of the transparent display device.

Figure 1:
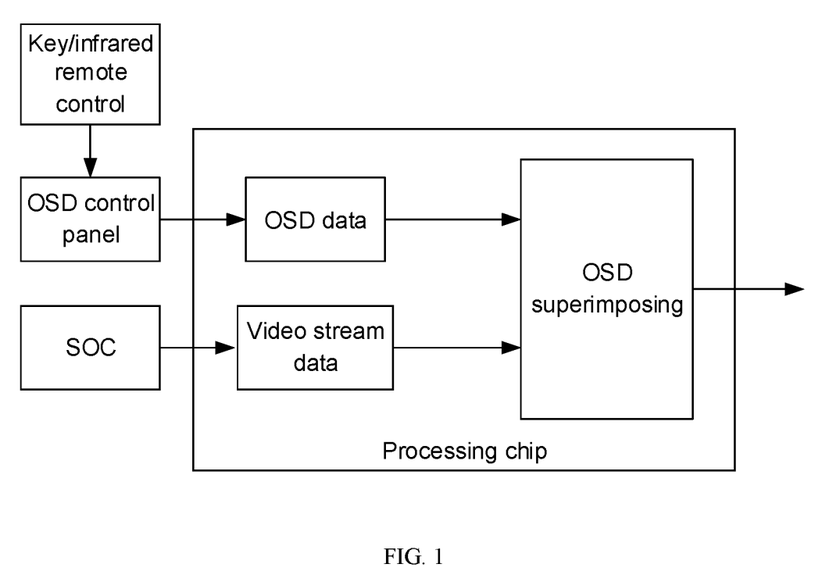
FIG. 1 is an architecture diagram of a superimposing solution of a current OSD menu provided according to an embodiment of the present disclosure.

As shown in FIG. 1, embodiments of the present disclosure provide an architecture diagram of a superimposing solution of a current OSD menu. A processing chip receives video stream data sent by a system on chip (SOC) through a High-Definition Multimedia Interface (HDMI), and an OSD superimposing function is realized by a separate OSD control panel that is controlled by a key and infrared remote control. The processing chip superimposes the received video stream data with OSD data sent by the OSD control panel, and outputs the superimposed video stream to a display end for displaying. However, in the actual adjustment and test process of the current architecture, it is difficult to implement the key and infrared remote control since the entire system (including the OSD control panel) is sealed in a vehicle. As a result, an OSD superimposing control function cannot be realized, and relevant displaying and video adjustment cannot be achieved through the OSD menu, which may affect a human-computer interaction experience between a user and the transparent display device, and is not convenient for subsequent operations and maintenance.

In view of the difficulty in adjusting and testing the transparent display device at present embodiments of the present disclosure provide a new human-computer interaction OSD superimposing architecture, which uses a main control module, such as a main control unit (MCU), as a master controller that can receive a control instruction of a front-loading video end and detect a working state of a system, thus generating a corresponding OSD control menu that interacts with a data processing module to realize an OSD display function of the video end. In addition, the front-loading video end supports remote wireless network control, and the main control module can also be controlled in real time through a master control system, thereby achieving relevant displaying and video adjustment, realizing a human-computer interaction function, effectively improving the debugging efficiency and facilitating subsequent operations and maintenance. The human-computer interaction OSD superimposing architecture achieves a real-time human-computer interaction function at both short and long distances, which effectively improves the competitiveness. This architecture can be used for brightness adjustment, power-on and power-off control, information displaying and the like, and play a very important role in actual debugging and application.

Figure 2:
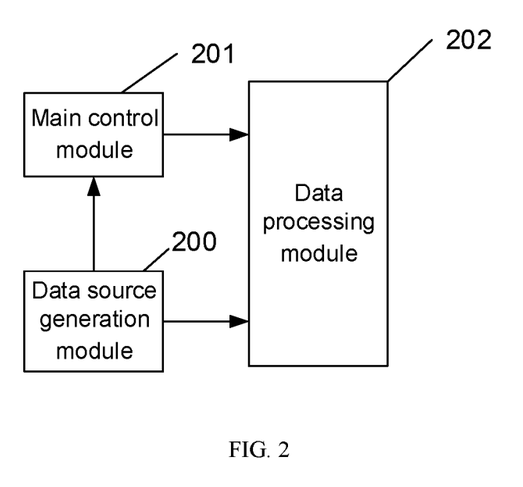
FIG. 2 is a schematic diagram of a human-computer interaction system of a display device provided according to an embodiment of the present disclosure.

As shown in FIG. 2, a human-computer interaction system of a display device provided in embodiments of the present disclosure include a data source generation module 200, a main control module 201 and a data processing module 202.

The data source generation module 200 is configured to generate a video stream and send the video stream to the data processing module.

In some embodiments, the data source generation module 200 in the embodiments includes but is not limited to an SOC module or other chips used for generating a data source, which is not excessively limited in the embodiments.

The main control module 201 is configured to receive an interactive instruction sent by a user, generate OSD data according to the interactive instruction, and transmit the OSD data to the data processing module.

In some embodiments, the main control module 201 in the embodiments includes but is not limited to a Micro Control Unit (MCU) module or other control chips, which is not excessively limited in the embodiments.

The data processing module 202 is configured to superimpose the received video stream with the OSD data, and output the superimposed video stream to a display end for displaying to make a response to the interactive instruction sent by the user.

In some embodiments, the data processing module 202 in the embodiments includes but is not limited to a Field-Programmable Gate Array (FPGA) module or other programmable chips, which is not excessively limited in the embodiments.

It should be noted that the human-computer interaction system in the embodiments can be applied to a transparent display device and other display devices to solve the problems of inconvenience in human-computer interactions and difficulty in device maintenance. The embodiments do not make more limitations on the specific form of a display device.

In some embodiments, the data source generation module 200 is mainly configured to generate and transmit a video source. The main control module 201 is mainly configured to receive and control the interactive instruction, control the generation and transmission of the OSD data, and the like. The data processing module 202 is mainly configured to analyze the video stream, receive and display the OSD data, process the video stream, control a data storage module, load a FLASH program, convert the video stream, and the like.

In some embodiments, the main control module 201 and the data processing module 202 are also configured to perform interaction of instructions, thus controlling a function control menu by means of an interactive instruction, for example, performing hot plug of an HDMI.

In some embodiments, the main control module 201 may receive the interactive instruction sent by the user in any one or more of the following manners.

1) The main control module 201 receives the interactive instruction sent, by means of a key, by the user.
2) The main control module 201 receives the interactive instruction sent, by means of a remote terminal, by the user.
3) The main control module 201 receives the interactive instruction sent, by means of both a key and a remote terminal, by the user.

In some embodiments, the main control module 201 receives, through the data source generation module 200, the interactive instruction sent, by means of the remote terminal, by the user. The remote terminal and the data source generation module 200 are in communication connection through a wireless network. Optionally, the remote terminal includes but is not limited to a PAD, a mobile phone terminal, or other portable terminals.

In implementation, the user can use a wireless network to send the interactive instruction to the data source generation module 200 by means of the remote terminal. The data source generation module 200 forwards the interactive instruction to the main control module 201. The main control module 201 forwards the interactive instruction to the data processing module 202. The data processing module 202 makes a corresponding response to the video stream and the OSD menu after receiving the interactive instruction.

In some embodiments, the main control module 201 and the data source generation module 200 in the embodiments are in communication connection based on an interface standard for serial data communication. Optionally, the main control module 201 and the data source generation module 200 communicate with each other through a 232 interface.

In implementation, the main control module 201 in the embodiments receives the interactive instruction of the user mainly by means of a key or a remote terminal. The key mainly plays the role in allowing the user to perform function debugging. The remote terminal can enable the user to remotely control the display device such as the transparent display device, and communicates with the data source generation module 200 mainly through the 232 interface. The main control module 201 receives the interactive instruction mainly through the key or the remote terminal and initiates an OSD operation.

In some embodiments, the main control module 201 in the embodiments is configured to transmit the OSD data to the data processing module through an SPI, and is also configured to transmit other data besides the OSD data to the data processing module through the SPI. In implementation, in the embodiments, the SPI is mainly used for transmission of the OSD data, interaction of registers, and the like. A check byte can also be added at the end of the OSD data to ensure the receiving accuracy of the OSD data.

In some embodiments, after the determination that the received video stream is displayed at the display end according to a preset requirement, the data processing module 202 sends an enable signal to the main control module 201, so as to instruct the main control module 201 to start to perform the OSD function. The main control module 201 transmits the OSD data to the data processing module 202 after receiving the enable signal.

In some embodiments, the data processing module 202 verifies the received OSD data, and superimposes the received video stream with the OSD data after the determination that the verification succeeds.

In some embodiments, the interactive instruction in the embodiments includes an update instruction. The main control module 201 is further configured to receive the update instruction sent by the user, generate a parameter according to the update instruction, and transmit the parameter to the data processing module 202. The data processing module 202 is configured to control, according to the received parameter, an update of data corresponding to the parameter.

In some embodiments, the parameter in the embodiments includes at least one of an OSD parameter or a video stream parameter. The OSD parameter includes at least one of a display duration, a display position or display transparency. The video stream parameter includes at least one of image brightness, contrast, saturation or acutance. The display duration, the display position and the display transparency are used for characterizing a display duration, display position and display transparency of the OSD menu actually displayed at the display end. The OSD menu can not only control the OSD menu itself, and also control the displaying of the video stream.

In implementation, the user can send the interactive instruction carrying the OSD parameter to the main control module 201, so as to control the display duration, display position and display transparency of the OSD menu through the data processing module 202. The user can also send the interactive instruction carrying the video stream parameter to the main control module 201, so as to control the image brightness, contrast, saturation, acutance or the like of the displaying of the video stream through the data processing module 202.

In some embodiments, the interactive instruction further includes a power-on or power-off instruction. The main control module 201 is configured to receive the power-on or power-off instruction sent by the user to control the display device, such as the transparent display device, to be powered on or powered off.

In some embodiments, if a time difference between the OSD data received by the data processing module 202 for two consecutive times is less than a threshold, the data processing module 202 superimposes the received video stream with the OSD data received at the second time. In implementation, in order to avoid the problem that the OSD menu responds slowly when the user fast switches different function control items in the OSD menu, in the embodiments, the OSD data that has been superimposed will not be displayed at this time if the data processing module 202 receives new OSD data again during the operation of superimposing the OSD data with the video stream, but the new OSD data and the video stream are superimposed and then are displayed.

In some embodiments, in order to reduce a transmission bandwidth and save bandwidth resources, in the embodiments, a data storage module is employed to double a frame rate of the video stream. In implementation, whether to double the frame rate of the received video stream can be determined on the basis of a frame rate of a video frame that can be displayed by a backend display.

In some embodiments, the data storage module includes but is not limited to a DDR (Double Data Rate Synchronous Dynamic Random Access Memory) module, or other memories with a storage function, which is not excessively limited in the embodiments.

In some embodiments, the data storage module is configured to double, in a manner of storing one frame of video stream and reading two frames of video stream, a frame rate of the video stream generated by the data source generation module, and sends the video stream having a doubled frame rate to the data processing module 202. The data processing module 202 superimposes the received video stream having the doubled frame rate with the OSD data.

In some embodiments, the data processing module 202 determines a read bit width of the OSD data according to bit widths of video frames in the video stream having the doubled frame rate. The data processing module 202 reads the OSD data according to the read bit width, and superimposes the OSD data read at each time with the video frames in the video stream having the doubled frame rate in sequence.

In some embodiments, the data processing module 202 in the embodiments performs the superimposing through the following steps.

Step 1): The data processing module takes a video frame received after receiving the OSD data as a start frame for superimposing.

Step 2): The quantity of frames of the video stream for superimposing is determined according to a display duration of the OSD data.

In implementation, in order to ensure that the OSD data and the video stream are displayed synchronously, a superimposing duration is determined according to the display duration of the OSD data, and video frames that need to be superimposed with the OSD data are determined from the video stream according to the superimposing duration. The superimposing duration is used for characterizing the quantity of video frames that are required to be used in the superimposing process. After the superimposing is completed, the OSD menu may display the display duration of the OSD data in synchronization with the video stream at the display end.

Step 3): The video stream is superimposed with the OSD data according to the start frame and the quantity of frames.

In implementation, starting from the start frame, the OSD data and the respective video frames are superimposed in sequence according to the quantity of frames and the sequence of the respective video frames, thereby ensuring the synchronism of displaying of the OSD menu and the video stream, improving the use experience of the user, and providing a real-time feed-back human-computer interaction experience from the user's perspective.

In some embodiments, the data processing module 202 in the embodiments performs format conversion on the superimposed video stream according to a pre-defined format, and outputs the video stream subjected to the format conversion to the display end for displaying.

In implementation, the data processing module 202 converts the superimposed video stream to be in a V-BY1 format (v-by-one, which is a signal standard specially developed for transmission of high-definition digital image signals), and then outputs the video stream to the display end for displaying.

Figure 3:
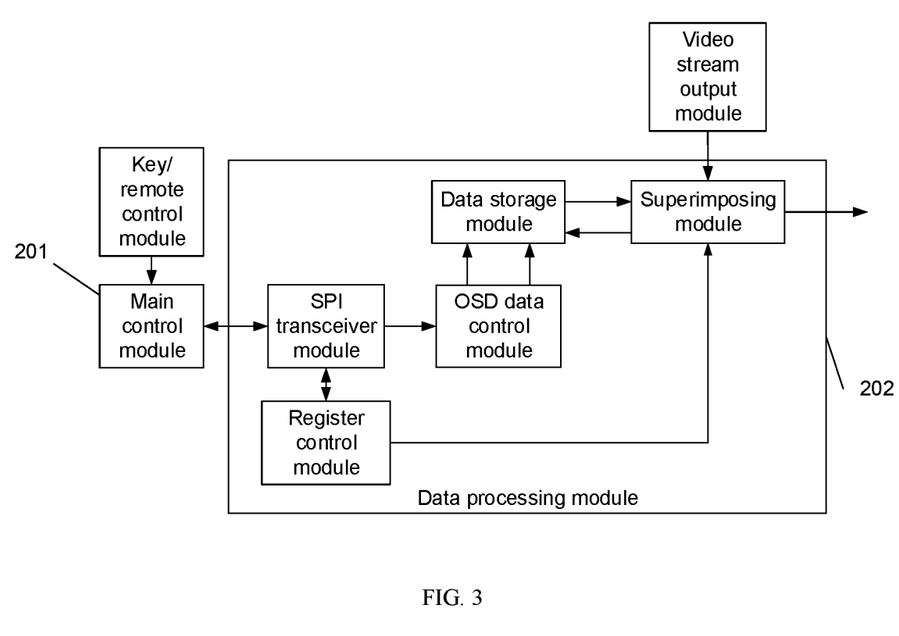
FIG. 3 is an architecture diagram of superimposing performed by a data processing module provided according to an embodiment of the present disclosure.

In some embodiments, as shown in FIG. 3, the embodiments further provide an architecture diagram of superimposing performed by a data processing module. The data processing module 202 includes an SPI transceiver module, a register control module, an OSD data control module, a data storage module such as a Random Access Memory (RAM), and a superimposing module.

The user sends an operation instruction to the main control module 201 by means of a key/remote control module. The main control module 201 initiates an OSD operation after receiving an interactive instruction sent by the key/remote control module. The main control module 201 is in communication connection with the SPI transceiver module in the data processing module by an SPI interface to perform transmission of the OSD data, interaction of registers, and processing of adding a check byte at the end of OSD data.

The OSD data control module is mainly configured to store OSD data for interaction control, video stream data and other control data (such as power-on or power-off control) to the data storage module in the data processing module, and store data of the registers to the register control module. The data storage module is mainly configured to store and access the OSD data. The register control module is mainly configured to update an OSD parameter and a video stream parameter, and cooperates with the superimposing module to control a parameter control function to be realized.

A video stream output module is mainly configured to perform corresponding OSD function transformation on the video stream to ensure that an OSD menu function and a video stream function are synchronously controlled. The superimposing module is mainly configured to perform a superimposing operation on the video stream and the OSD data, for example, a superimposing position, superimposing time and display transparency.

Figure 4:
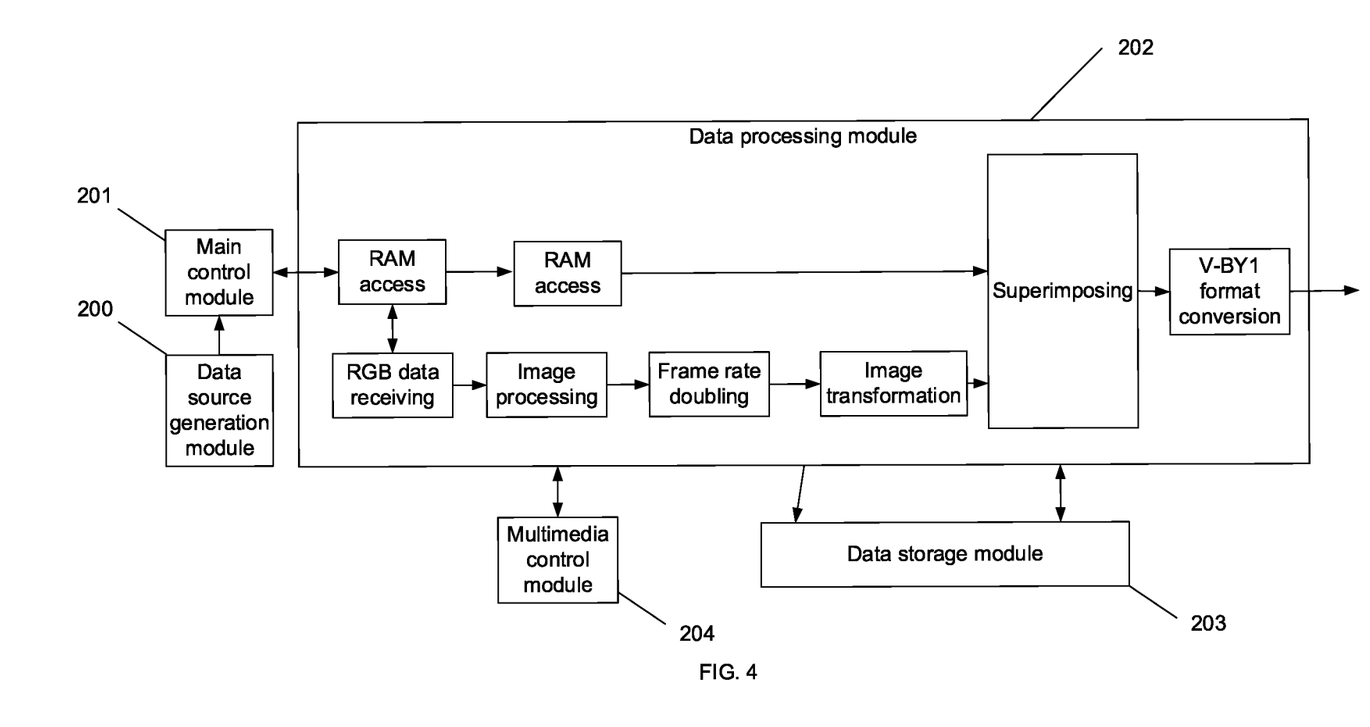
FIG. 4 is an architecture diagram of an OSD data superimposing solution provided according to an embodiment of the present disclosure.

In some embodiments, as shown in FIG. 4, the embodiments further provide an architecture diagram of an OSD data superimposing solution, including a data source generation module 200, a main control module 201, a data processing module 202, a data storage module 203, a multimedia control module 204, such as FLASH (Adobe Flash, a multimedia software platform) module.

The data source generation module 200 is mainly configured to generate and transmit a video source. The main control module 201 is mainly configured to receive and control an interactive instruction, control generation and transmission of an OSD menu, and the like. Main functions of the data processing module 202 include analyzing a video stream, receiving OSD data, displaying the OSD menu, processing the video stream, controlling the data storage module, loading a FLASH program, performing V-BY1 signal conversion, and the like.

In implementation, the data processing module 202 analyzes a video stream sent, by means of an HDMI, by the data source generation module 200. For example, a video stream obtained by analysis is 1080 P-60 Hz, RGB888, the analyzed video stream, after image processing, is stored to the data storage module 203, and a frame rate of the video stream is doubled in a manner of storing one frame and reading two frames. Image transformation is performed on the video stream having a doubled frame rate. If no OSD data needs to be superimposed. V-BY1 format conversion is performed on the video stream subjected to the image transformation, and the video stream subjected to format conversion is output to the display end for displaying. If there is OSD data needs to be superimposed, the video stream subjected to the image transformation and the OSD data sent by the main control module 201 are superimposed; V-BY1 format conversion is performed on the superimposed video stream; and the video stream subjected to format conversion is output to the display end for displaying.

Figure 5A:
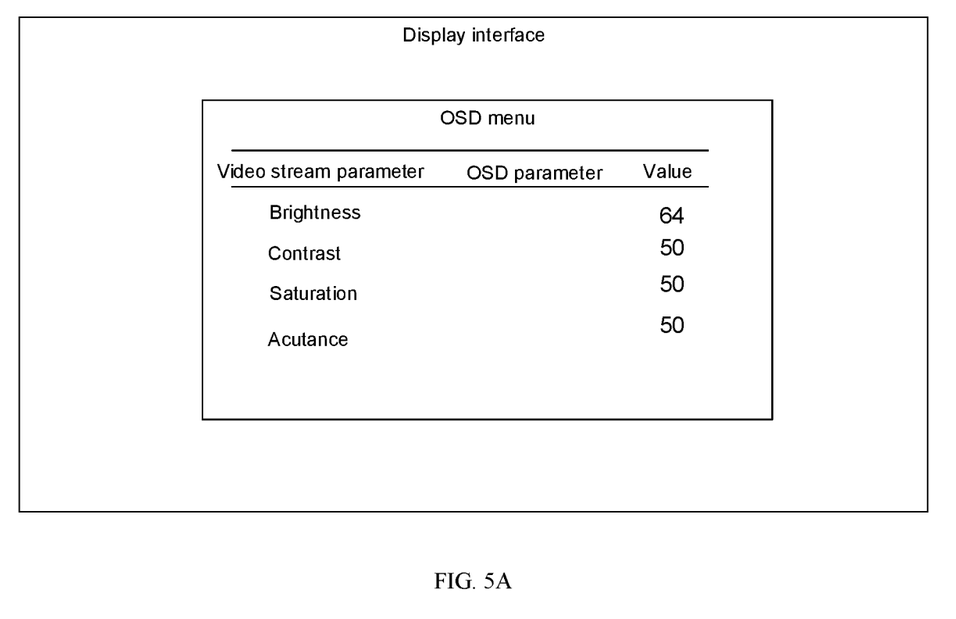
FIG. 5A is a functional diagram of OSD data superimposing provided according to an embodiment of the present disclosure.
Figure 5B:
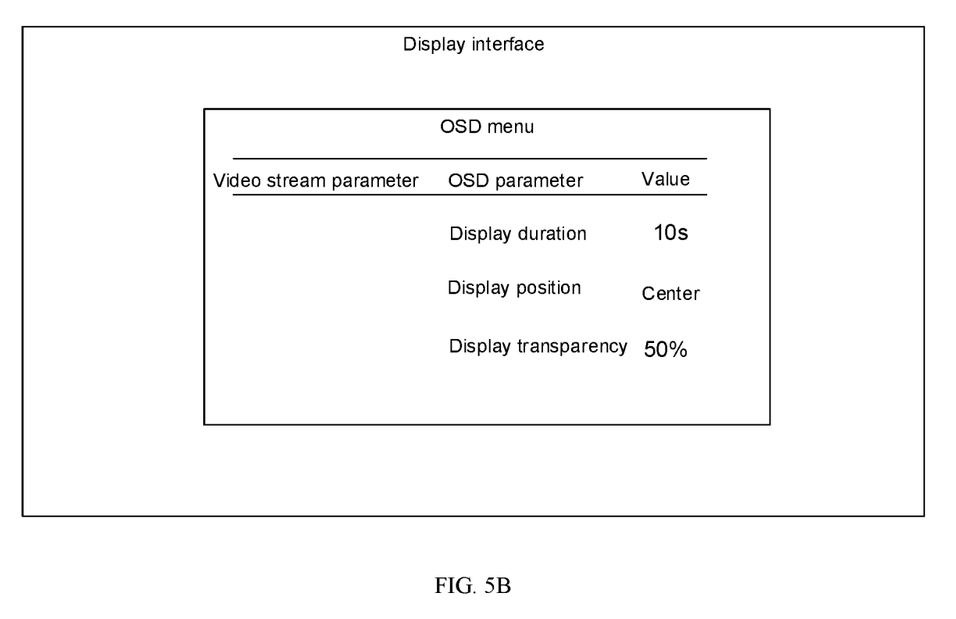
FIG. 5B is a functional diagram of OSD data superimposing provided according to an embodiment of the present disclosure.

In some embodiments, as shown in FIG. 5A and FIG. 5B, the embodiments provide a functional diagram of OSD data superimposing. The OSD menu shown in the figure can provide for the user with various control methods for a display device, mainly including controlling displaying of the OSD menu and displaying of the video stream. For example, display transparency, a display duration, a display position and the like of the OSD menu can be controlled. The brightness, contrast, acutance and the like of displaying of the video stream can also be controlled. The user can adjust various options in the OSD menu and various options in a video stream menu by means of operating a key or a remote terminal to control the brightness, contrast, acutance and the like of displaying of the video stream. The OSD data may be superimposed with a video stream or an image. If the OSD data is superimposed with a video stream, the display end displays the video stream in real time simultaneously when the user adjusts parameters in the OSD menu after the superimposing, so that the playing and displaying of the video stream will not be interrupted due to the fact that the user adjusts the OSD menu. If the OSD data is superimposed with an image, the display end displays the image simultaneously when the user adjusts parameters in the OSD menu after the superimposing. In addition, in the embodiments, the display transparency of the OSD menu can be adjusted. Due to the display manner based on different transparencies, the user can watch the displayed video stream while adjusting the OSD menu.

Figure 6:
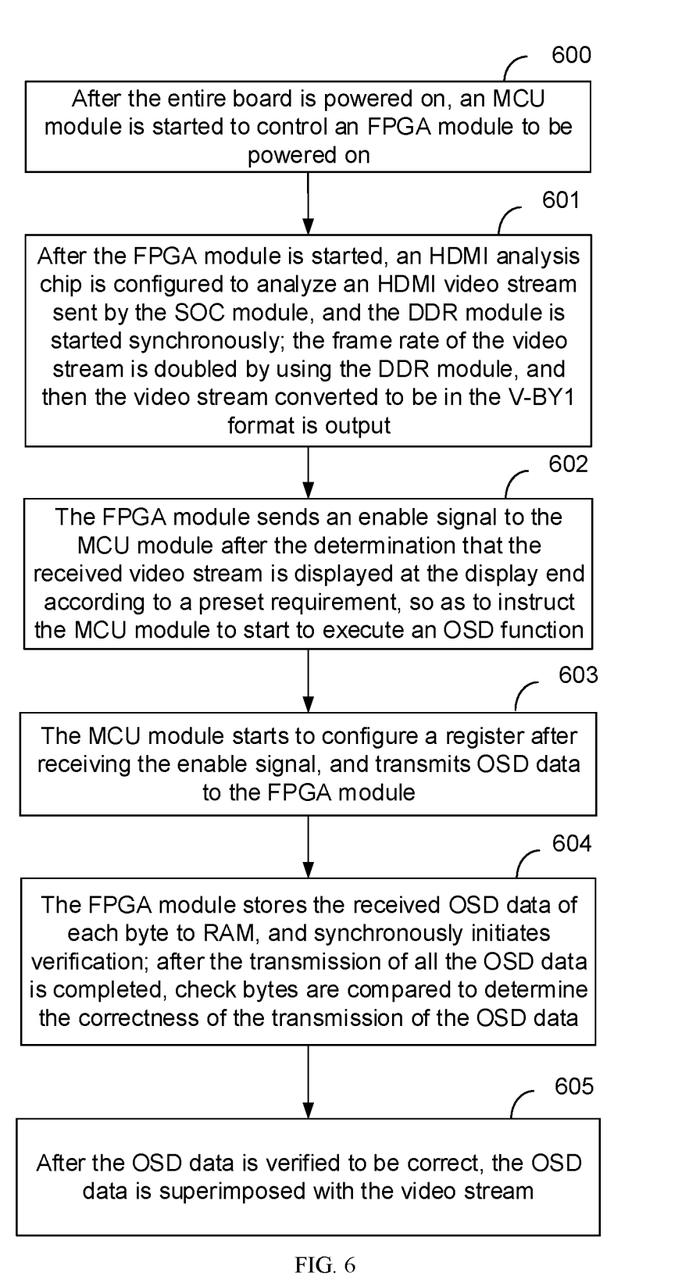
FIG. 6 is a flowchart of implementation of OSD data superimposing of a human-computer interaction system of a display device provided according to an embodiment of the present disclosure.

In some embodiments, as shown in FIG. 6, the embodiments provide a flowchart of implementation of OSD data superimposing of a human-computer interaction system based on a display device. In the case of an MCU module serving as a main control module, an SOC module serving as a data source generation module, an FPGA module serving as a data processing module, and a DDR module serving as a data storage module as an example, the flow of implementation of OSD data superimposing provided by the embodiments is described below: Specific implementation steps are as follows.

Step 600: After the entire board is powered on the MCU module is started to control the FPGA module to be powered on.

Step 601: After the FPGA module is started, an HDMI analysis chip is configured to analyze an HDMI video stream sent by the SOC module, and the DDR module is started synchronously. The frame rate of the video stream is doubled by using the DDR module, and then the video stream converted to be in the V-BY1 format is output.

Step 602: The FPGA module sends an enable signal to the MCU module after the determination that the received video stream is displayed at the display end according to a preset requirement, so as to instruct the MCU module to start to execute an OSD function.

Step 601 needs to be re-executed for configuration or to check other problems if it is determined that the received video stream is not displayed at the display end according to the preset requirement, for example, if the video stream is abnormal.

Step 603: the MCU module starts to configure a register after receiving the enable signal, and transmits OSD data to the FPGA module.

Step 604: The FPGA module stores the received OSD data of each byte to RAM, and synchronously initiates verification. After the transmission of all the OSD data is completed, check bytes are compared to determine the correctness of the transmission of the OSD data.

Step 605: After the OSD data is verified to be correct, the OSD data is superimposed with the video stream.

In implementation, after the OSD data is verified to be correct, rows and columns of new video frames are counted. Then, the OSD data in the RAM is synchronously read with reference to coordinate information of the OSD data stored in the register module. Since the DDR module doubles the frame rate of the video stream, and the DDR has a read bit width of 96 bit (4 pixel), in order to ensure synchronous superimposing. OSD data of 4 bit is read at each time and is superimposed with one video frame.

In implementation, the FPGA module takes a video frame received after receiving the OSD data as a start frame for superimposing, determines, according to a display duration of the OSD data, the quantity of frames of the video stream for superimposing, and superimposes the video stream with the OSD data according to the start frame and the quantity of frames.

If no new OSD data is received after the display duration, the video stream is normally output and waits for next superimposing operation. If there is new OSD data input during the superimposing operation, the new OSD data needs to be received in time, and the new OSD data and the video stream are superimposed. A start frame for superimposing and the quantity of frames are recalculated according to the display duration of the new OSD data.

Figure 7:
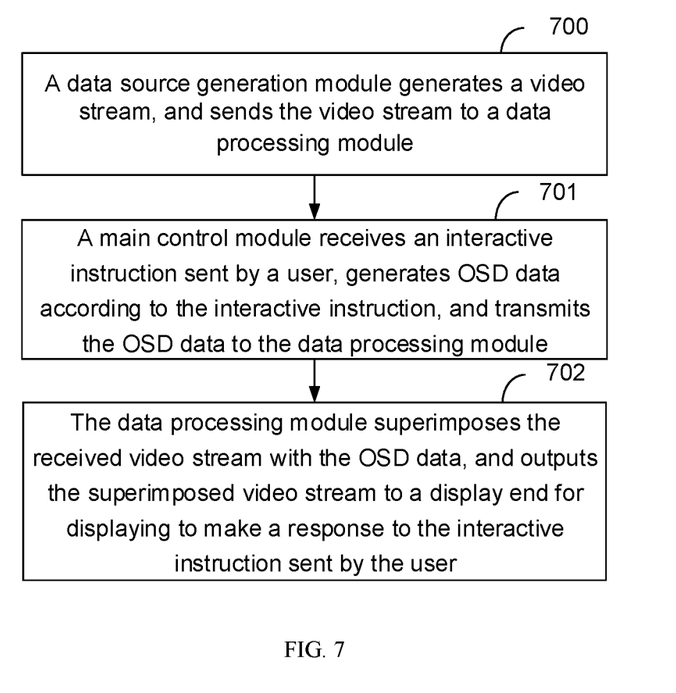
FIG. 7 is a flowchart of implementation of a human-computer interaction method of a display device provided according to an embodiment of the present disclosure.

Embodiment 2: Based on the same inventive concept, embodiments of the present disclosure further provide a human-computer interaction method of a display device. Since the method is a method applied to the system in the embodiments of the present disclosure. The principle of the method for solving the problem is similar to that of the system. Therefore, implementation of this method may refer to the implementation of the system, and the repetitions will not be described here. As shown in FIG. 7, the method includes following steps.

Step 700, generating, by a data source generation module, a video stream, and sending, by a data source generation module, the video stream to a data processing module.

Step 701, receiving, by a main control module, an interactive instruction sent by a user, generating OSD data according to the interactive instruction, and transmitting the OSD data to the data processing module.

Step 702, superimposing, by the data processing module, the received video stream with the OSD data, and outputting the superimposed video stream to a display end for displaying to make a response to the interactive instruction sent by the user.

In some embodiments, the receiving, by main control module, the interactive instruction sent by the user includes:
receiving, by the main control module, the interactive instruction sent, by means of a key; by the user; and/or,
receiving, by the main control module, the interactive instruction sent, by means of a remote terminal, by the user.

In some embodiments, the receiving, by the main control module, the interactive instruction sent, by means of the remote terminal, by the user includes:
receiving, by the data source generation module, the interactive instruction sent, by means of the remote terminal, by the user, and sending the interactive instruction to the main control module, wherein the remote terminal and the data source generation module are in communication connection through a wireless network.

In some embodiments, the superimposing, by the data processing module, the received video stream with the OSD data includes:
superimposing, by the data processing module, the received video stream with the OSD data received at the second time if a time difference between the OSD data received for two consecutive times is less than a threshold.

In some embodiments, the method further includes:
doubling, in a manner of storing one frame of video stream and reading two frames of video stream by using a data storage module, a frame rate of the video stream generated by the data source generation module, and sending the video stream having a doubled frame rate to the data processing module, so as to instruct the data processing module to superimpose the received video stream having the doubled frame rate with the OSD data.

In some embodiments, superimposing, by the data processing module, the received video stream having the doubled frame rate with the OSD data includes:
determining, by the data processing module, a read bit width of the OSD data according to bit widths of video frames in the video stream having the doubled frame rate; and
reading, by the data processing module, the OSD data according to the read bit width, and superimposing the OSD data read at each time with the video frames in the video stream having the doubled frame rate in sequence.

In some embodiments, the superimposing, by the data processing module, the received video stream with the OSD data includes:
taking, by the data processing module, a video frame received after receiving the OSD data as a start frame for superimposing;
determining, according to a display duration of the OSD data, the quantity of frames of the video stream for superimposing; and
superimposing the video stream with the OSD data according to the start frame and the quantity of frames.

In some embodiments, the superimposing, by the data processing module, the received video stream with the OSD data includes:
verifying, by the data processing module, the received OSD data, and superimposing the received video stream with the OSD data after the determination that the verification succeeds.

In some embodiments, the outputting, by the data processing module, the superimposed video stream to the display end for displaying includes:
performing, by the data processing module, format conversion on the superimposed video stream according to a pre-defined format; and
outputting the video stream subjected to the format conversion to the display end for displaying.

In some embodiments, the transmitting, by the main control module, the OSD data to the data processing module includes:
controlling the data processing module to send an enable signal to the main control module after the determination that the received video stream is displayed at the display end according to a preset requirement, so as to instruct the main control module to transmit the OSD data to the data processing module after receiving the enable signal.

In some embodiments, the interactive instruction includes an update instruction. The human-computer interaction method further includes:
receiving, by the main control module, the update instruction sent by the user, generating a parameter according to the update instruction, and transmitting the parameter to the data processing module; and
controlling an update of data corresponding to the parameter by the data processing module according to the received parameter.

In some embodiments, the parameter includes at least one of an OSD parameter or a video stream parameter: the OSD parameter includes at least one of a display duration, a display position or display transparency; and the video stream parameter includes at least one of image brightness, contrast, saturation or acutance.

Based on the same inventive concept, embodiments of the present disclosure further provide a computer storage medium which stores a computer program. The program, when executed by a processor, implements the following steps.

A data source generation module generates a video stream, and sends the video stream to a data processing module.

A main control module receives an interactive instruction sent by a user, generates OSD data according to the interactive instruction, and transmits the OSD data to the data processing module.

The data processing module superimposes the received video stream with the OSD data, and outputs the superimposed video stream to a display end for displaying to make a response to the interactive instruction sent by the user.

Those skilled in the art should understand that the embodiments of the present disclosure may be provided as a method, a system or a computer program product. Therefore, the present disclosure may adopt the form of a complete hardware embodiment, a complete software embodiment, or a software and hardware combination embodiment. In addition, the present disclosure may adopt the form of a computer program product implemented on one or more computer-available storage media (including, but not limited to, a magnetic disk memory, an optical memory and the like) including computer-available program codes.

The present disclosure is described with reference to flowcharts and/or block diagrams of methods, devices (systems) and computer program products according to the embodiments of the present disclosure. It should be understood that computer program instructions can be used to implement each flow and/or each block in the flowcharts and/or the block diagrams and a combination of a flow and/or a block in the flowcharts and/or the block diagrams. These computer program instructions may be provided for a processor of a general computer, a dedicated computer, an embedded CPU or other programmable data processing devices to produce a machine, such that instructions that are executed by the processor of the computer or other programmable data processing devices may produce a device for realizing specified functions in one or multiple flows of the flow diagrams and/or one or multiple blocks of the block diagrams.

These computer program instructions can be stored in a computer-readable memory that can instruct the computer or other programmable data processing devices to work in a specific way, so that instructions stored in the computer-readable memory produce an artifact that includes an instruction device. The instruction device implements a specified function in one or more processes in the flowcharts and/or in one or more blocks in the block diagrams.

These computer program instructions can be loaded onto the computer or other programmable data processing devices, so that a series of operations and steps are performed on the computer or other programmable devices, thereby generating computer-implemented processing. Therefore, the instructions executed on the computer or other programmable devices provide steps for implementing a specified function in one or more processes in the flowcharts and/or in one or more blocks in the block diagrams.

Obviously, those skilled in the art can make various changes and modifications to the present disclosure without departing from the spirit and scope of the present disclosure. Therefore, if these changes and modifications of the present disclosure fall within the scope of the claims of the present disclosure and equivalent technologies of the present disclosure, the present disclosure is intended to include these changes and modifications.

What is claimed is:

1. A human-computer interaction system of a display device, comprising a data source generation module, a main control module, a data processing module, and a data storage module, wherein
the data source generation module is configured to generate a video stream and send the video stream to the data processing module;
the main control module is configured to receive an interactive instruction sent by a user, generate On Screen Display (OSD) data according to the interactive instruction, and transmit the OSD data to the data processing module;
the data processing module is configured to superimpose the received video stream with the OSD data, and output the superimposed video stream to a display end for displaying to make a response to the interactive instruction sent by the user;
the data storage module is configured to double, in a manner of storing one frame of video stream and reading two frames of video stream, a frame rate of the video stream generated by the data source generation module, and send the video stream having a doubled frame rate to the data processing module; and
the data processing module is configured to superimpose the received video stream having the doubled frame rate with the OSD data.

2. The system according to claim 1, wherein the main control module receives an interactive instruction sent by a user, which comprises:

receiving, by the main control module, the interactive instruction sent, through a key, by the user; and/or, receiving, by the main control module, the interactive instruction sent, through a remote terminal, by the user.

3. The system according to claim 2, wherein said receiving, by the main control module, the interactive instruction sent, through the remote terminal, by the user comprises:

receiving, by the main control module, the interactive instruction sent, through the remote terminal, by the user via the data source generation module;

wherein the remote terminal and the data source generation module are in communication connection through a wireless network; and the main control module and the data source generation module are in communication connection based on an interface standard for serial data communication.

4. The system according to claim 1, wherein the data processing module superimposes the received video stream with the OSD data, which comprises:

superimposing the received video stream with the OSD data received at a second time by the data processing module under a condition that a time difference between the OSD data received by the data processing module for two consecutive times is less than a threshold.

5. The system according to claim 1, wherein the data processing module superimposes the received video stream having the doubled frame rate with the OSD data, which comprises:

determining, by the data processing module, a read bit width of the OSD data according to bit widths of video frames in the video stream having the doubled frame rate; and reading, by the data processing module, OSD data according to the read bit width, and superimposing the OSD data read at each time with the video frames in the video stream having the doubled frame rate in sequence.

6. The system according to claim 1, wherein the data processing module superimposes the received video stream with the OSD data, which comprises:

taking, by the data processing module, a video frame received after receiving the OSD data as a start frame for superimposing;

determining, according to a display duration of the OSD data, a quantity of frames of the video stream for superimposing; and superimposing the video stream with the OSD data according to the start frame and the quantity of frames.

7. The system according to claim 1, wherein the main control module is configured to transmit the OSD data to the data processing module through a serial peripheral interface (SPI).

8. The system according to claim 1, wherein the data processing module superimposes the received video stream with the OSD data, which comprises:

verifying, by the data processing module, the received OSD data, and superimposing the received video stream with the OSD data after it is determined that the verification succeeds.

9. The system according to claim 1, wherein the data processing module outputs the superimposed video stream to a display end for displaying, which comprises:

performing, by the data processing module, format conversion on the superimposed video stream according to a pre-defined format; and outputting the video stream subjected to the format conversion to the display end for displaying.

10. The system according to claim 1, wherein the main control module transmits the OSD data to the data processing module, which comprises:

sending, by the data processing module, an enable signal to the main control module after a determination that the received video stream is displayed at the display end according to a preset requirement, so as to instruct the main control module to start to execute an OSD function; and transmitting, by the main control module, the OSD data to the data processing module after receiving the enable signal.

11. The system according to claim 1, wherein the interactive instruction comprises an update instruction;

the main control module is further configured to receive the update instruction sent by the user, generate a parameter according to the update instruction, and transmit the parameter to the data processing module; and the data processing module is configured to control an update of data corresponding to the parameter according to the received parameter.

12. A human-computer interaction method of a display device, applied to the system according to claim 1, the method comprising:

generating, by the data source generation module, a video stream, and sending the video stream to the data processing module;

receiving, by a main control module, an interactive instruction sent by a user, generating OSD data according to the interactive instruction, and transmitting the OSD data to the data processing module; and superimposing, by the data processing module, the received video stream with the OSD data, and outputting the superimposed video stream to a display end for displaying to make a response to the interactive instruction sent by the user.

13. The method according to claim 12, wherein said receiving, by the main control module, the interactive instruction sent by the user comprises:

receiving, by the main control module, the interactive instruction sent, through a key, by the user; and/or, receiving, by the main control module, the interactive instruction sent, through a remote terminal, by the user.

14. The method according to claim 12, wherein said superimposing, by the data processing module, the received video stream with the OSD data comprises:

superimposing, by the data processing module, the received video stream with the OSD data received at a second time under a condition that a time difference between the OSD data received for two consecutive times is less than a threshold.

15. The method according to claim 12, further comprising:

doubling, in a manner of storing one frame of video stream and reading two frames of video stream by the data storage module, a frame rate of the video stream generated by the data source generation module, and sending the video stream having a doubled frame rate to the data processing module, so as to instruct the data processing module to superimpose the received video stream having the doubled frame rate with the OSD data.

16. The method according to claim 12, wherein said superimposing, by the data processing module, the received video stream with the OSD data comprises:
- taking a video frame received after receiving the OSD data as a start frame for superimposing;
- determining, according to a display duration of the OSD data, a quantity of frames of the video stream for superimposing; and
- superimposing, by the data processing module, the video stream with the OSD data according to the start frame and the quantity of frames.

17. The method according to claim 12, wherein said transmitting, by the main control module, the OSD data to the data processing module comprises:
- controlling the data processing module to send an enable signal to the main control module after a determination that the received video stream is displayed at the display end according to a preset requirement, so as to instruct the main control module to transmit the OSD data to the data processing module after receiving the enable signal.

18. The method according to claim 12, wherein the interactive instruction comprises an update instruction, and the method further comprises:
- receiving, by the main control module, the update instruction sent by the user, generating a parameter according to the update instruction, and transmitting the parameter to the data processing module; and
- controlling an update of data corresponding to the parameter by the data processing module according to the received parameter.

19. A non-transitory computer storage medium, which stores a computer program, wherein the program, when executed by a processor, implements the steps of the method according to claim 12.

20. A human-computer interaction system of a display device, comprising a data source generation module, a main control module and a data processing module, wherein
- the data source generation module is configured to generate a video stream and send the video stream to the data processing module;
- the main control module is configured to receive an interactive instruction sent by a user, generate On Screen Display (OSD) data according to the interactive instruction, and transmit the OSD data to the data processing module; and
- the data processing module is configured to superimpose the received video stream with the OSD data, and output the superimposed video stream to a display end for displaying to make a response to the interactive instruction sent by the user;
- wherein the data processing module superimposes the received video stream with the OSD data, which comprises:
- taking, by the data processing module, a video frame received after receiving the OSD data as a start frame for superimposing;
- determining, according to a display duration of the OSD data, a quantity of frames of the video stream for superimposing; and
- superimposing the video stream with the OSD data according to the start frame and the quantity of frames.

* * * * *